United States Patent

[11] 3,580,268

| [72] | Inventor | Homer J. Shafer |
| | | 2300 Park Ave. W., Mansfield, Ohio 44906 |
| [21] | Appl. No. | 758,787 |
| [22] | Filed | Sept. 10, 1968 |
| [45] | Patented | May 25, 1971 |

[54] LUBRICANT SEAL FOR ROTARY VALVE
6 Claims, 4 Drawing Figs.

[52] U.S. Cl. .................................................137/246.22,
251/174, 251/315, 137/246.11
[51] Int. Cl. .................................................... F16k 5/22
[50] Field of Search...........................................137/246.22,
246.14, 246.13, 246.11, 246, 246.12; 251/174,
175, 315

[56] References Cited
UNITED STATES PATENTS

| 2,360,599 | 10/1944 | Volpin | 137/246.12X |
| 3,269,692 | 8/1966 | Shafer | 251/315X |
| 3,323,537 | 6/1967 | Shafer | 251/315X |
| 2,011,113 | 8/1935 | Neuhaus | 137/246.11 |
| 2,119,766 | 6/1938 | Aderhold | 137/246.14 |
| 3,155,368 | 11/1964 | Shafer | 251/175 |
| 3,306,315 | 2/1967 | Cook | 251/174X |
| 3,416,558 | 12/1968 | Works | 251/174X |

Primary Examiner—Clarence R. Gordon
Attorney—Hamilton, Cook, Renner & Kenner

ABSTRACT: A valve having a rotary valve element with an exterior seating surface substantially abutting seating elements in the upstream and downstream ends of the valve housing, there being lubricant sealing grooves in the seating surface or in the seating elements to provide lubricant seals at the upstream and downstream ends of the valve in its closed position, and separate lubricant passageways in the valve element for connecting with said sealing grooves and extending into and laterally out of the rotary valve stem, there being lateral lubricant supply ports in the stem housing for registering with said passageways in the closed position of the valve.

The invention relates generally to rotary valves, and more particularly to lubricant sealing construction for ball valves.

INVENTOR.
HOMER J. SHAFER
BY Hamilton, Cook,
Renner & Kenner
ATTORNEYS

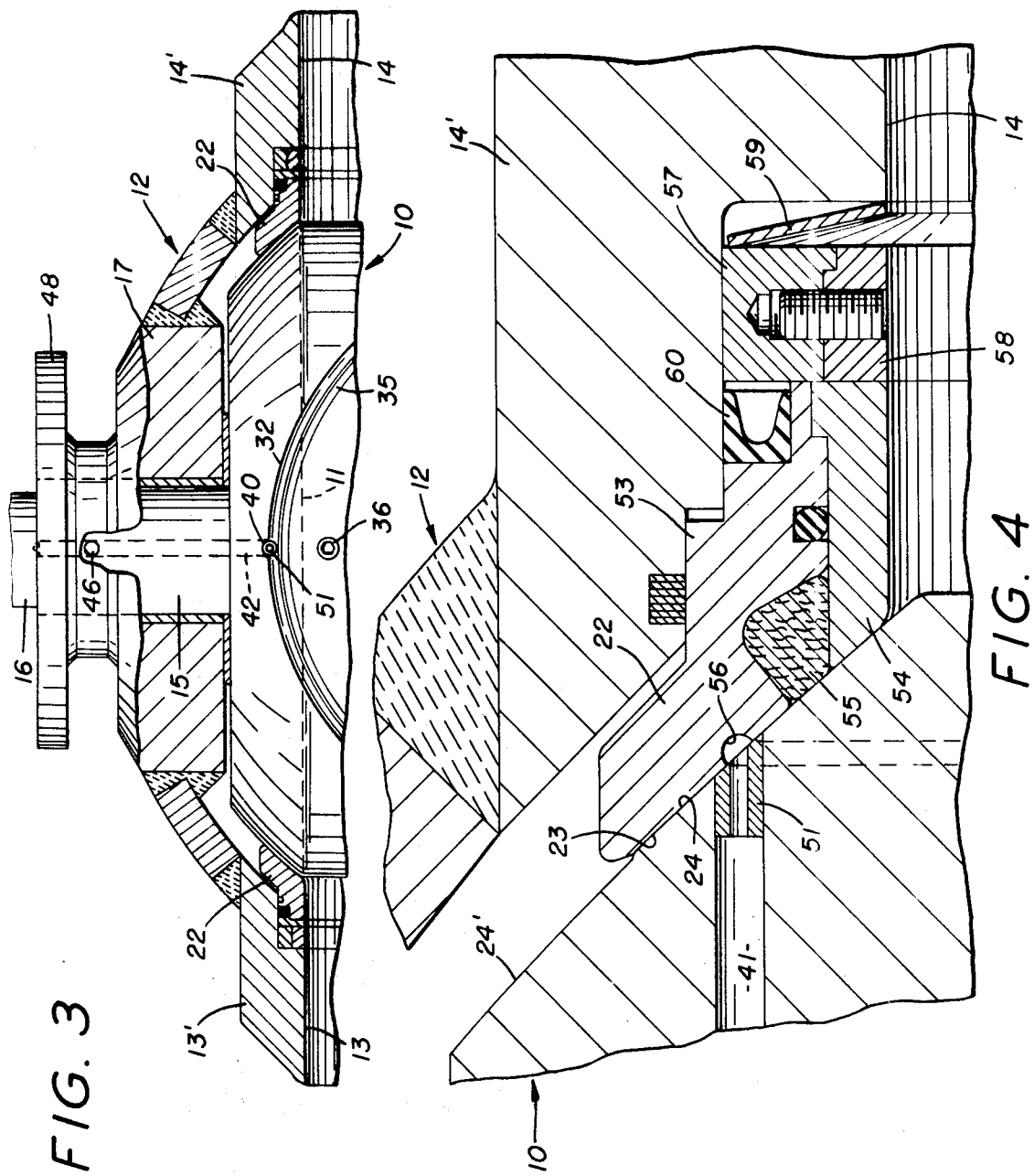

LUBRICANT SEAL FOR ROTARY VALVE

BACKGROUND OF THE INVENTION

In many rotary valves it is desirable to supplement the usual resilient seals in the seating elements of the housing with lubricant seals, especially where the efficiency of the resilient seals is impaired under high-pressure conditions, and lubricant sealing grooves are provided in the seating elements adjacent to the resilient sealing rings. These lubricant grooves ordinarily have been supplied with lubricant through ports extending through the valve housing and seating elements directly to the grooves. This requires providing ports extending through both the housing wall and the seating rings, and sealing the ports at the joints between the seating rings and the housing.

In my prior U.S. Pat. No. 3,155,368, FIG. 6 shows lubricant sealing grooves in the ball supplied from passageways in the ball connected to a lubricant supply duct extending axially of the valve stem. Lubricant sealing grooves in the seating rings can be supplied in the same way. In either case the lubricant being supplied to the grooves is repeatedly dissipated when the valve is rotated to and from its closed position unless the lubricant feed is manually or independently shut off at the outer end of the supply passageway each time the valve is rotated, and it is not practicable to rely upon some person to perform this act.

In a construction such as in FIG. 6 of U.S. Pat. No. 3,155,368, if the feed is not shut off when the ball is rotated and the lubricant grooves cross over the flow ports, the incoming lubricant is dissipated into the main flow of the valve. In a similar construction wherein the lubricant grooves are in the seating rings, when the ball is rotated to open position without shutting off the lubricant supply, lubricant is constantly dissipated from the supply passages in the ball into the housing cavity surrounding the ball.

SUMMARY OF THE INVENTION

It is a general object of the present invention to provide a rotary valve having an improved lubricant supply through the valve stem so constructed and arranged as to shut off the lubricant supply automatically each time the valve is rotated from fully closed to or toward open position.

A more specific object is to provide for independent control of the lubricant supply to the upstream and downstream lubricant seals.

These and other objects are accomplished by providing separate lubricant passageways in the valve stem leading through the valve element to the upstream and downstream seals, and lubricant supply ports extending through the housing around the stem for registering with the lubricant passageways only when the valve is in closed position.

DESCRIPTION OF THE DRAWINGS

FIG. 3 is a fragmentary elevation, partly in section, with the valve element in open position.

FIG. 4 is a view similar to FIG. 2 of another embodiment of the invention.

DESCRIPTION OF PREFERRED EMBODIMENTS

Figure 1:
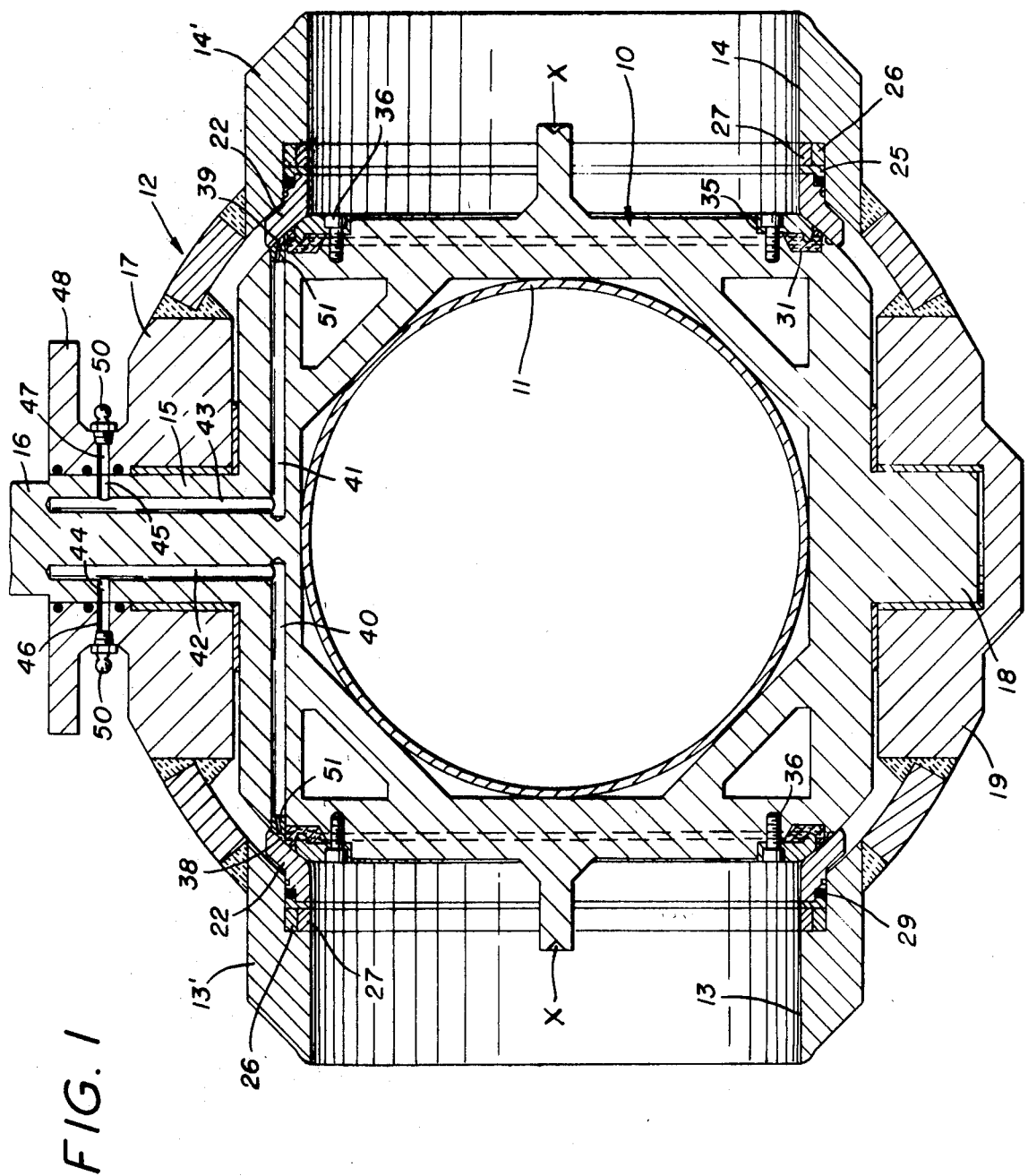
FIG. 1 is a vertical sectional view of a ball valve having a preferred embodiment of the improved lubricant seal comprising the invention, showing the ball valve element in closed position.
Figure 2:
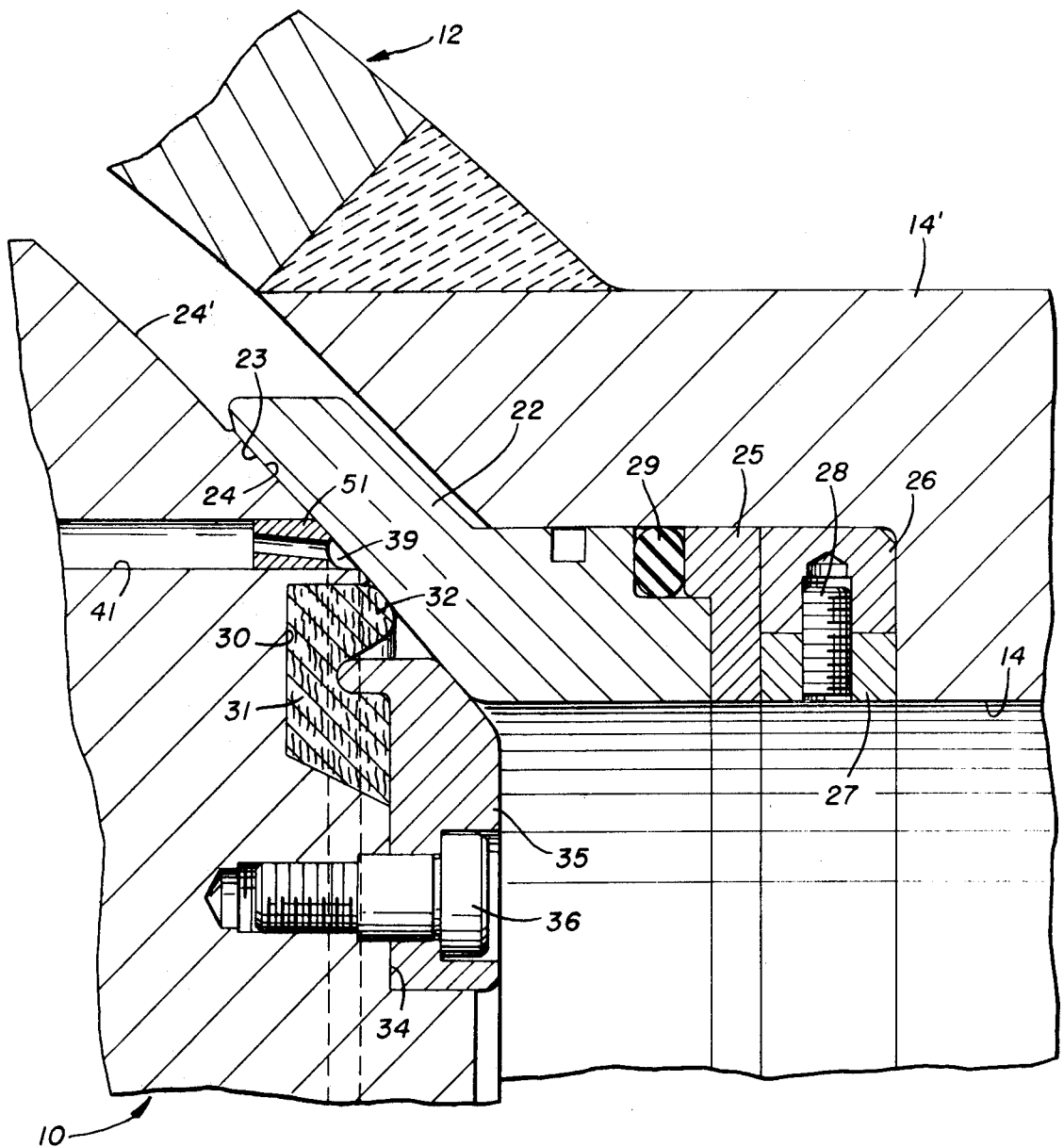
FIG. 2 is an enlarged fragmentary view similar to FIG. 1.

The improved lubricant sealing means is shown by way of example in FIGS. 1—3 in a ball valve of welded construction, but it will be understood that the lubricant sealing means may be embodied in other types of ball valves and rotary valves. The ball valve shown has a ball valve element indicated generally at 10 having an axial flowway 11 which in open position coincides with the flow axis of the valve body 12, and as indicated in FIG. 3, the flowway 11 is the same diameter as the inner diameters of flow ports 13 and 14 of the flow tubes 13' and 14' which are welded into the valve body.

Preferably, the valve element 10 has diametrically opposite trunnions at right angles to the flowway 11, which are journaled in the valve body. The upper trunnion 15 extends upwardly to form the valve stem 16 and is journaled in a trunnion bearing 17 welded into the valve body, and the lower trunnion 18 is journaled in a lower trunnion bearing 19. Suitable means for rotating the ball valve element 10 is mounted on the extended portion 16 of the valve stem.

The flow tubes 13' and 14' have seating ring assemblies mounted in their inner ends. Each assembly comprises a seating ring 22 having a spherical inner surface 23 conforming with the annular spherical exterior 24 on the ball 10, a backup ring 25, and spacing and retaining rings 26 and 27. The retaining ring 26 may be split or in removable sections, and the ring 27 is preferably a split ring having overlapping ends which are secured to ring 26 by screw means 28. The rings 26 and 27 when removed allow retraction of rings 25 and insertion or removal of O-ring 29 after the seating rings 22 are in place.

The ball 10 has annular grooves 30 on its closed sides to receive and hold the annular resilient sealing rings 31 which encircle and extend radially outward of the flow ports 13 and 14 so that the outer exposed legs 32 of the rings seal against the inner seating surfaces 23 of the seating rings 22. The grooves 30 merge with inner annular grooves 34 which receive retaining rings 35 overlapping the rings 31 and extending radially outward a slight amount behind the seating rings 22.

Preferably, the retaining rings 35 are made in several abutting sections held in place by screws 36 so that the sections can be inserted or removed through the flow ports to allow insertion or removal of the flexible sealing rings 31 through the flow ports.

Supplementing the sealing rings 31 are annular lubricant grooves 38 and 39 formed in the annular spherical surfaces 24 of the ball radially outward of and adjacent to the legs 32 of the sealing rings, so that the grooves 38 are well within the spherical inner surfaces 23 of the seating rings. These grooves 38 and 39 are supplied with lubricant preferably by separate passageways 40 and 41, respectively, extending through the ball transversely of the flow axis from points near the stem axis and connected at their inner ends to passageways 42 and 43, respectively, extending into the stem 15 and parallel to the stem axis.

The upper portions of the passageways 42 and 43 connect with lateral supply ports 44 and 45, respectively, in the stem, and in the fully closed position of the valve element, the ports 44 and 45 register with lateral supply ports 46 and 47 extending through the neck of housing 12 formed in the trunnion bearing under the attaching flange 48. Suitable lubricant fittings 50 may be screwed into the supply ports 46 and 47 to permit lubricant to be forced therethrough while preventing return flow.

In the operation of the valve, when the valve element is in the fully closed position of FIG. 1, lubricant can be forced through the fittings 50 to supply both lubricant grooves 38 and 39 simultaneously, if desired. Preferably, plugs 51 are screwed into the outer ends of passageways 40 and 41, and said plugs 51 have reduced diameter orifices therein to meter the flow of lubricant to the grooves 38 and 39.

If it is desired to have a lubricant seal at only one side of the ball, the lubricant may be supplied to the desired side only. For example, if sealing groove 38 is on the upstream side of the ball, and a lubricant seal is not desired or necessary on the downstream side, lubricant can be forced through passageways 46, 44, 42 and 40 only, and not through the passageways connected to the downstream seal.

Whether lubricant is being supplied to the upstream sealing groove 38 or to the downstream sealing groove 39, or both, when the valve element 10 is rotated away from fully closed position, the lubricant supply is automatically shut off. Hence, as the grooves 38 and 39 cross over the flow ports to the partly open or fully open position of the valve element, the only lubricant lost into the flow ports 14 or into the valve housing cavity surrounding the ball is what is in the grooves and the supply passageways thereto. Accordingly, it is not necessary for any manual or other positive control of the lubricant supply each time the valve is operated, as has been necessary with prior constructions.

In the conventional method of machining the ball by centering it on the flow axis, the conformance between the ball and the seating surfaces is closer in the open position than in the closed position, and hence the seal is not adequate in the closed position, particularly at high pressures. In the present construction, in order to provide close conformance of the exterior ball surface 24 in closed position with the spherical annular inner surfaces 23 of the seating rings 22, so that substantially tight seal is provided at each lubricant groove 39, the spherical surface 24 on the ball is preferably machined on the ball by rotating the ball on lathe centers X,X on the transverse axis of the ball perpendicular to its stem axis and also at right angles to its flow axis.

The remaining spherical annular surfaces 24' are then machined using the same axis as a center and these surfaces can be relieved on the order of two or three thousandths of an inch, as indicated in FIG. 2, as close conformance of these surfaces with the seating rings is not necessary in the open position or as the ball moves to and from closed position.

In the embodiment of the invention shown in FIG. 4, the lubricant sealing grooves at the valve seating surfaces are formed in the seating ring surfaces rather than in the ball surface. The supply passages in the ball, stem and housing are identical to those in the embodiment of FIGS. 1—3. While the seating ring assemblies may be identical, a somewhat different assembly is shown by way of example in FIG. 4.

In FIG. 4, the seating ring has two interfitting annular parts 53 and 54, both having spherical seating surfaces conforming to the exterior surface of the ball 10. A resilient sealing ring 55 is held between the parts 53 and 54 with the nose of the ring sealing against the ball surface, and the adjacent sealing ring groove 56 registers with the supply groove 41 when the valve element 10 is in fully closed position. The seating parts 53 and 54 are held against the ball by radially contractable split or sectional rings 57 and 58 which are removable to allow retraction of part 54 and insertion or removal of sealing ring 55 through the flow port. A bellville spring washer 59 preferably resiliently urges the rings 57 and 58 against the seating parts and a U-shaped sealing ring 60 is preferably inserted between seating ring part 53 and backup ring 57.

In the embodiment of FIG. 4, when the valve element 10 is rotated away from fully closed position the lubricant supply to the lubricant passageways 40 and 41 is automatically shut off as in the embodiment of FIGS. 1—3 by nonregister of the lateral ports 44 and 45 with the supply ports 46 and 47 in the housing around the valve stem. As the supply plugs 51 rotate away from the seating rings 53 they pass into the cavity within the housing 12 surrounding the ball valve element 10, but the only lubricant which can be dissipated into the cavity is that left in the supply passageways in the ball because the pressure feed is shut off from the supply ports in the housing.

I claim:

1. In a valve having a housing provided with a flow tube and a neck at right angles thereto, a seating element in and surrounding the opening in said flow tube having a seating surface, and a rotary valve element having a stem rotatable in said housing neck and an exterior seating surface conforming to said seating element surface, the improvement comprising a continuous lubricant sealing groove in one of said seating surfaces surrounding the flow tube opening in the fully closed position of the valve element, a lubricant passageway in said valve element connected to said lubricant groove at least in the fully closed position of the valve element, said passageway extending into said stem, and a lateral lubricant supply port in said housing neck connecting with the passageway in said stem only in the fully closed position of the valve element.

2. The valve of claim 1, in which the lubricant sealing groove is in the seating surface of the valve element.

3. The valve of claim 1, in which the lubricant sealing groove is in the seating surface of the seating element.

4. The valve of claim 1, in which upstream and downstream seating elements having seating surfaces are provided in the flow tube conforming with the seating surface on the valve element, separate lubricant sealing grooves are provided in one of the seating surfaces at both upstream and downstream ends of the valve, separate lubricant passageways in said valve element and extending into the stem are connected to said grooves at least in the fully closed position of the valve element, and separate lateral lubricant supply ports in the housing neck connect with said passageways in said stem only in the fully closed position of the valve element.

5. The valve of claim 4, in which the lubricant sealing grooves are in the seating surface of the valve element.

6. The valve of claim 4, in which the lubricant sealing grooves are in the seating surfaces of the upstream and downstream seating elements.